United States Patent [19]

Suehiro et al.

[11] Patent Number: 5,213,216
[45] Date of Patent: May 25, 1993

[54] VIBRATORY SIEVE WITH SCREEN AND ANNULAR RING MEMBER THEREON

[75] Inventors: Atsuo Suehiro, Aichi; Makoto Shirai, Toyohashi, both of Japan

[73] Assignee: Osaka Gas Company Limited, Osaka, Japan

[21] Appl. No.: 847,871

[22] Filed: Mar. 9, 1992

Related U.S. Application Data

[63] Continuation of Ser. No. 633,934, Dec. 26, 1990, abandoned.

[30] Foreign Application Priority Data

Dec. 28, 1989 [JP] Japan .................. 1-344382

[51] Int. Cl.⁵ .............................................. B07B 1/00
[52] U.S. Cl. .................................. 209/236; 209/254; 209/268; 209/323; 209/382; 209/387; 210/414; 210/415
[58] Field of Search ............... 209/235, 236, 254, 268, 209/269, 323, 379, 382, 385, 387; 210/413, 414, 415

[56] References Cited

U.S. PATENT DOCUMENTS

| | | | |
|---|---|---|---|
| 711,133 | 10/1902 | Snyder | 209/382 |
| 2,455,383 | 12/1948 | Pickard | 209/323 |
| 3,508,649 | 4/1970 | Kahane et al. | 209/323 |
| 3,863,765 | 2/1975 | Gray | 209/323 |
| 3,960,731 | 6/1976 | Brandt | 210/413 X |
| 4,540,485 | 9/1985 | Lanerie | 209/323 |
| 4,613,432 | 9/1986 | Racine et al. | 209/254 |
| 4,810,372 | 3/1989 | Jones | 209/323 X |

FOREIGN PATENT DOCUMENTS

| | | | |
|---|---|---|---|
| 200424 | 4/1958 | Austria | 209/379 |
| 1535652 | 1/1990 | U.S.S.R. | 209/379 |
| 982928 | 2/1965 | United Kingdom . | |

Primary Examiner—Andres Kashnikow
Assistant Examiner—Joseph A. Kaufman
Attorney, Agent, or Firm—Larson and Taylor

[57] ABSTRACT

Disclosed is a vibratory sieve for separation of fibrous materials from materials containing them, the vibratory sieve comprising a sieve body and a mechanism for imparting vibration to the sieve, the sieve body including a screen to be vibrated by the mechanism, the sieve being adapted to convey a mixture of water and the materials containing the fibrous materials onto the screen through meshes of which finer particles and water are passed by the vibration of the screen, leaving the fibrous materials on the screen, the sieve being characterized in that the sieve is provided with an annular member which is movable on the screen surface by the vibration of the screen and whose movement is confined by an inlet member in such a way that the mixture of water and the materials containing the fibrous materials is placed inside the annular member.

7 Claims, 4 Drawing Sheets

VIBRATORY SIEVE WITH SCREEN AND ANNULAR RING MEMBER THEREON

This application is a continuation of application Ser. No. 07/633,934 filed Dec. 26, 1990 now abandoned.

BACKGROUND OF THE INVENTION

1. Field of the Invention

The present invention relates to a vibratory sieve for sifting fibrous materials like asbestos from massed materials containing them.

2. Description of the Prior Art

Asbestos has been frequently used as refractory materials such as building materials. Since it has been recently found that asbestos is carcinogenic, repair works are under way to remove asbestos from the walls of public facilities and the like. If the asbestos-containing waste thus removed is discarded as it is, the asbestos dust suspends in air at the dumping site and flies away, tending to scatter a source of pollutant. Consequently asbestos must be separated from such waste before disposal. At present, attention is directed to the use of a vibratory sieve to separate the asbestos at low costs. In the operation of the vibratory sieve, the asbestos-containing waste is comminuted and mixed with water, the mixture is placed onto the vibrating screen of a sieve, and finer particles and water are passed through screen meshes, leaving the separated asbestos on the screen.

Asbestos and like fibrous materials are easily entangled in screen meshes, thereby directly causing clogging in screen meshes. Because of this drawback, vibratory sieves have entailed difficulties in separating fibrous materials like asbestos.

SUMMARY OF THE INVENTION

The present invention has been accomplished to overcome the foregoing problem.

It is an object of the present invention to provide a vibrating sieve which is capable of separating fibrous materials like asbestos from massed materials containing them with increased efficiency while avoiding clogging in screen meshes.

According to the present invention, there is provided a vibratory sieve for separation of fibrous materials from materials containing them, the vibratory sieve comprising a sieve body and means for producing vibration, the sieve body including a screen to be vibrated by the vibration-producing means, the sieve being adapted to convey a mixture of water and the materials containing the fibrous materials onto the screen through meshes of which finer particles and water are passed by the vibration of the screen, leaving the fibrous materials on the screen, the sieve being characterized in that the sieve is provided with an annular member which is movable on the screen surface by the vibration of the screen and with means for confining the movement of the annular member such that the mixture of water and the materials containing the fibrous materials is placed inside the annular member.

DETAILED DESCRIPTION OF THE INVENTION

In operating the sieve of the invention, materials containing fibrous materials as mixed with water are conveyed onto the screen being vibrated. Disposed on the screen is the annular member adapted to move on a confined screen portion corresponding to the screen area on which the materials containing fibrous materials and water are placed, so that they never fail to be placed inside the annular member. Then the materials containing fibrous materials and water placed on the screen inside the annular member wait for finer particles and water to pass through screen meshes, leaving the separated fibrous materials on the screen inside the annular member. During this operation, the annular member is rotated and moved in various directions on the screen surface by the vibration of the screen, whereby numerous fibrous materials are raked by the annular member along the inner circumferential surface thereof to become bundled together into one spherical mass. The formed spherical mass is forced out outside of the annular member by the water overflowing from the inside thereof toward the outer periphery thereof and is discharged from the screen surface. The other fibrous materials remaining without forming a spherical mass attempt to, but fail to entangle in screen meshes inside and outside of the annular member. These fibrous materials attempting to tangle in meshes are pulled away by the annular member which is being rotated and moved in various directions on the screen surface by the vibration of the screen while continuously scratching the screen surface. The foregoing function of the annular member serves to prevent clogging in screen meshes.

Separated fibrous materials like asbestos are forced out outside the annular member without forming a spherical mass inside the annular member. A major portion thereof, however, is formed into a spherical mass outside the annular member.

BEST MODE FOR CARRYING OUT THE INVENTION

One embodiment of the present invention is described below with reference to the accompanying drawings in which.

Figure 1:
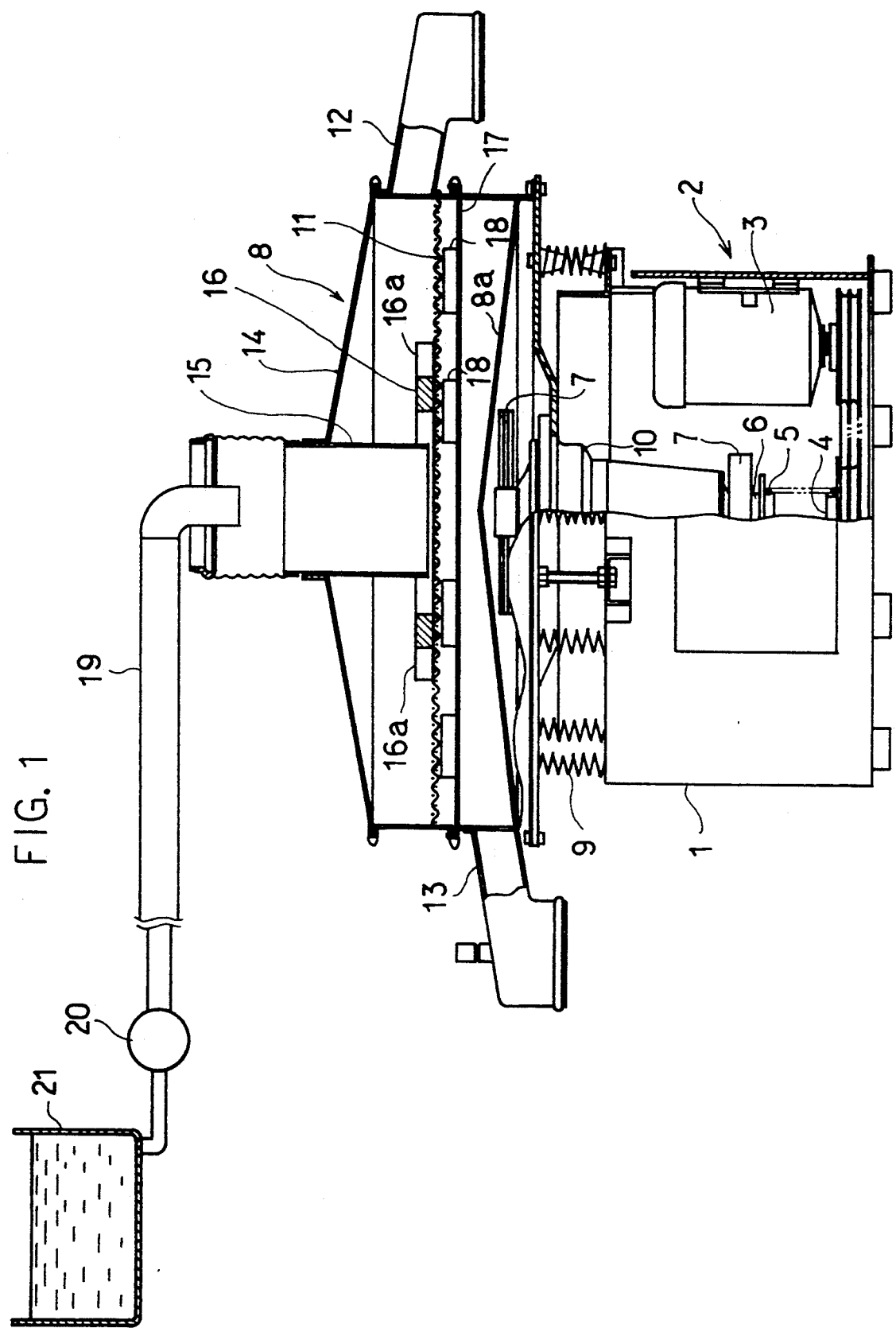
FIG. 1 is a front view in vertical section showing one embodiment of the invention in its entirety.
Figure 2:
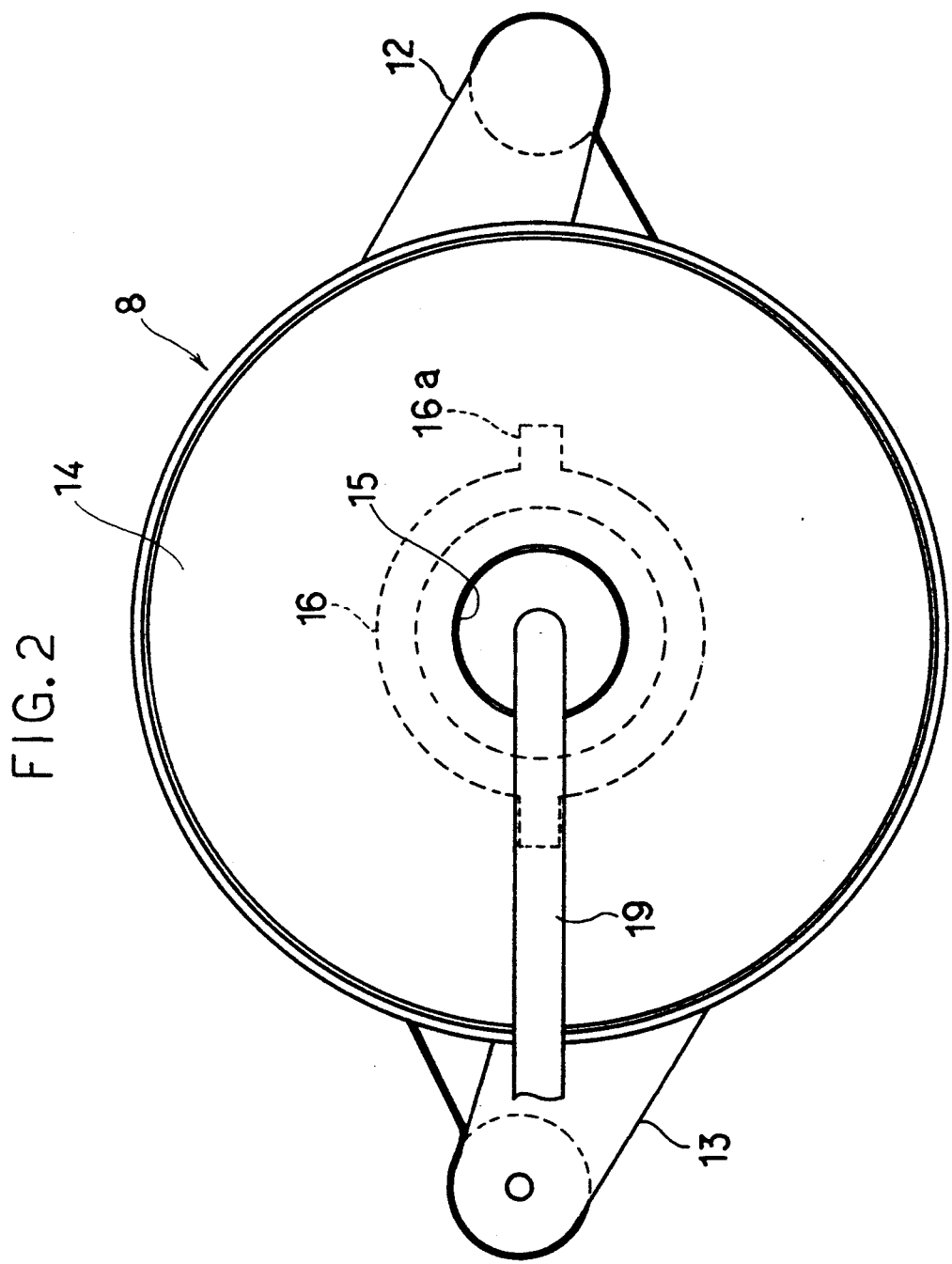
FIG. 2 is a plan view of the embodiment.

A cylindrical base 1 includes means 2 for producing vibration. The vibration producing means 2 comprises a motor 3, a driving shaft 4 rotatable by the motor 3, a driven shaft 6 connected to the shaft 4 via a spring 5, and unbalanced weights 7, 7 engaged in the upper and lower ends of the driven shaft 6. A cylindrical sieve body 8 is vibrantly supported on the base 1 with a plurality of springs 9 mounted therebetween. The upper end of the driven shaft 6 in the vibration producing means 2 is rotatably supported in the center of a tapered bottom plate 8a with a housing 10 mounted intermediately. A sieve screen 11 is horizontally arranged in the sieve body 8 and serves to partition the sieve body 8 into upper and lower chambers. An outlet opening 12 is formed on a level with the screen 11 at an upper right portion of the sieve body 8 to discharge the spherical mass of fibrous materials remaining on the screen. Another outlet opening 13 is formed at a lower left portion of the sieve body 8 to discharge the finer particles and water passed through the screen 11.

A cylindrical inlet member 15 for passing the materials containing fibrous materials and water therethrough is vertically disposed in the center of a cover 14 for closing the upper space of the sieve body 8. The lower end of the member 15 is positioned near the screen 11. The clearance formed between the lower end of the member 15 and the screen 11 is of a size sufficient to allow the passage of the materials containing fibrous materials therethrough. Arranged on the screen 11 is an annular member 16 made of rubber in the form of a circular ring. The annular member 16 can be rotationally moved in any direction on the screen surface by the vibration of the screen 11 although within the confined movement range. As shown in FIG. 1, the inlet member 15 is extended at its lower end into the inside of the annular member 16 so that the movement of the annular member 16 is confined by the lower end circumference of the inlet member 15 to assure the drop of the materials containing fibrous materials and water from the inlet memeber 15 into the internal portion of the annular member 16. Thus according to the embodiment, the lower portion of the inlet member 15 functions as the means for confining the movement of the annular member 16.

Figure 3:
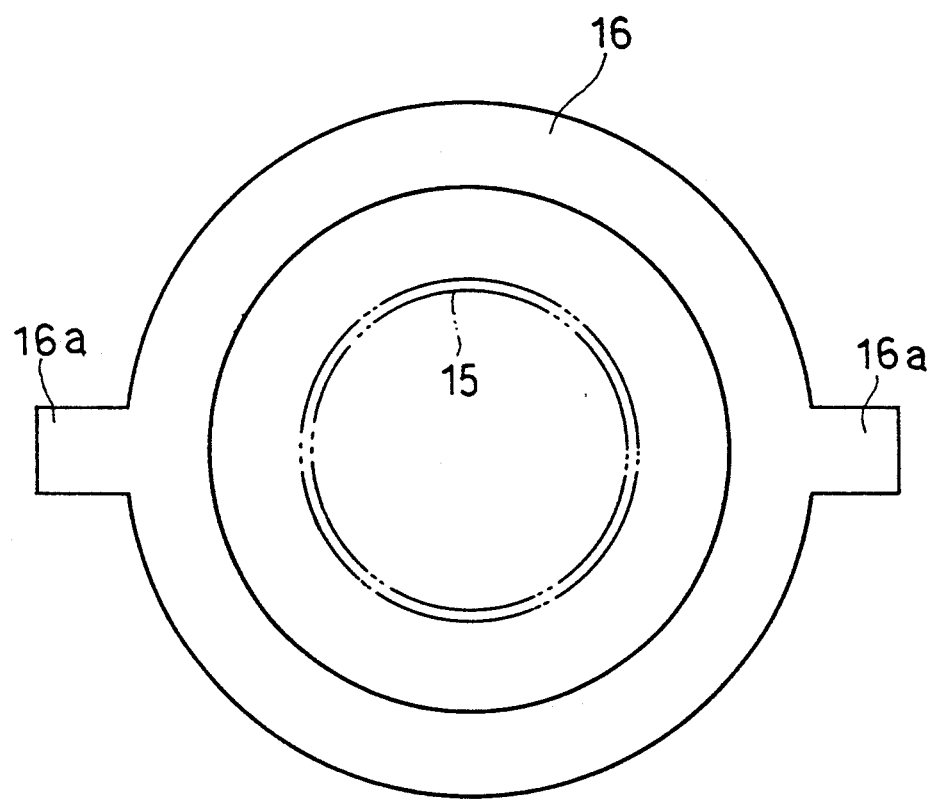
FIG. 3 is a plan view of an annular member.

Projections 16a are formed, for example, at two positions in the outer periphery of the annular member 16 as shown in FIG. 3 to rake the fibrous materials more effectively. The annular member 16 as well as the projections 16a have a flat underside (bottom surface) which is slidingly moved in their entirety (including the uninterrupted circumferential contact of the bottom surface of annular member 16) on the surface of the screen 11.

A receiving plate 17 made of, e.g., punching metal is provided immediately below the screen 11 as shown in FIG. 1. A plurality of disc-like tapping rubber members 18 are placed on the receiving plate 17. The tapping rubber members 18 are caused to jump and repeatedly tap the underside of the screen 11 by the vibration of the screen during the operation, whereby clogging in screen meshes is prevented.

A supply pipe 19 for the feed of the materials containing fibrous materials and water into the inlet member 15 is connected via a pump 20 to a mixing tank 21 in which the materials containing fibrous materials are mixed with water.

Figure 4:
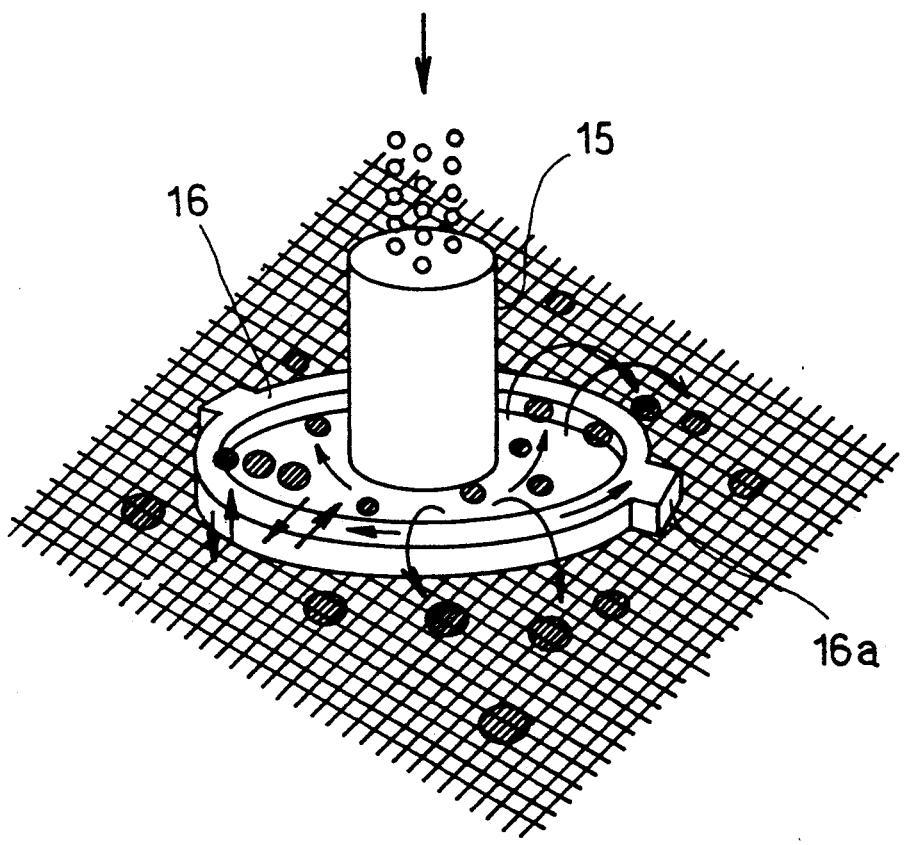
FIG. 4 is a perspective view of the annular member.

The sieve of the invention operates as follows. In sifting fibrous materials, the materials containing fibrous materials are comminuted and the particles are mixed with water to give a slurry in the mixing tank 21. Thereafter the screen 11 is vibrated by energizing the motor 3 in the vibration producing means 2. Then the slurry in the tank 21 is charged by energizing the pump 20 into the inlet member 15 through the supply pipe 19, whereupon the slurry is allowed to drop through the inlet member 15 onto the screen 11. Since the annular member 16 whose movement is confined by the lower portion of the inlet member 15 is placed on the screen 11, the slurry is invariably introduced into the inner portion of the annular member 16 as shown in FIG. 4. Of the particles and water of the slurry placed onto the screen 11 inside the annular member 16, finer particles pass along with the water through the meshes of the screen 11, and the fibrous materials are left on the screen inside the annular member 16. During the operation, the annular member 16 is rotated and moved in various directions on the screen surface by the vibration of the screen 11 so that numerous fibrous materials are raked by the circumferentially closed confining wall of the annular member 16 along the internal circumferential surface thereof and become bundled together into a spherical mass which is then forced out outwardly from the annular member 16 by the water overflowing toward the outer periphery of the annular member 16. The spherical mass of fibrous materials is rolled on the screen 11 toward the outer periphery of the annular member 16 by the vibration and is eventually discharged from the outlet opening 12 on a level with the screen 11. On the other hand, the other fibrous materials remaining without forming a spherical mass attempt to, but fail to entangle in screen meshes inside and outside the annular member 16 due to the following function of the annular member 16. The annular member 16 is rotated and slidingly moved in numerous directions on the screen surface by the vibration of the screen 11, continuously scratching the screen surface, whereby the fibrous materials attempting to entangle in meshes are pulled away from meshes. In other words, the annular member 16 is also useful for prevention of clogging in screen meshes and serves to achieve continued sieving operation for an extended period of time.

Some of separated asbestos and like fibrous materials are forced out outside the annular member 16 without forming a spherical mass inside the annular member 16. A major portion thereof, however, is formed into a spherical mass outside the annular member 16.

Utilizing the rotary motion of annular member 16 made on vibration of the screen 11, projections 16a are formed on the peripheral surface of the annular member 16. The projections 16a can be slidingly moved on a wide area of screen surface by the rotary motion of the member 16, efficiently raking the fibrous materials, whereby the fibrous materials can be pulled away from meshes more effectively.

The embodiment has another advantage that the structure of the sieve is simplified (or the number of components can be reduced) by the use of inlet member 15 as means for confining the movement of the annular member 16. However, the present invention is not limited to the above embodiment. Means for confining the movement of the annular member 16 may be independently provided on the sieve body 18 or on the screen 11.

The annular member 16 which is circularly annular in the above embodiment may be polygonally annular. The projections 16a extending from the outer periphery of the annular member 16 may be variously modified, for example, to give projections suitably altered in the shape and the number.

The annular member 16 may be rectangular, circular, oval or otherwise shaped in the cross section. An annular member of oblong or square section can rake fibrous materials more effectively. The highest raking efficiency can be achieved by an annular member of oblong section.

The annular member 16 can internally retain the supplied water so that a major quantity of the water is discharged through screen meshes inside the annular member 16. As a result, a relatively small amount of the water is contained in the asbestos and like fibrous materials discharged from the outlet opening 12, resulting in the ease of disposal of the asbestos and like fibrous materials.

The annular member 16 can be made of various materials including rubber, plastics, aluminum, etc. Among these materials, rubber, flexible plastics and like non-rigid or soft materials are desirable because they will not hinder the vibration of the screen nor damage the meshes thereof.

The vibration producing means is one capable of generating vibration by any conventional mode which permits the sifted fibrous materials like asbestos to move outwardly of the annular member 16. The transfer of water-free fibrous materials like asbestos to the outlet opening 12 is made easy by carrying out a mode of vibration by which the fibrous materials like asbestos can be moved in a helical or involute form toward outside the annular member 16.

Main members of the illustrated sieve have the following dimensions and are made of the undermentioned materials. The screen 11 is 1000 mm in diameter and a 30-mesh one made of stainless steel. The annular member 16 has an inside diameter of 300 mm, an outer diameter of 400 mm and a thickness of 20 mm, and is made of natural rubber. Projections 16a are 50 mm in length and oblong in the cross section. The lower end of the inlet member 15 is spaced away by a distance of 10 mm from the screen 11. In the depicted embodiment, a slurry comprising water and 5 wt % or less of asbestos is passed through the inlet member 15 onto the screen 11 where the asbestos is separated.

The screen of the sieve may be of a shape other than the circular one as shown in FIG. 1.

As described above, the sieve of the invention is provided with the annular member which is movable on the surface of the screen by the vibration thereof, and with the means for confining the movement of the annular member so as to introduce the materials containing fibrous materials and water into inside the annular member. Having such structure, the sieve of the invention is capable of separating fibrous materials like asbestos with high efficiency and preventing clogging in screen meshes due to the annular member which can scratch the screen surface by the screen vibration.

The fibrous materials which can be sifted by the vibratory sieve of the invention include other materials than asbestos such as glass fibers, rock wool, etc.

We claim:

1. A vibratory sieve for separation of fibrous material from materials containing them, the vibratory sieve comprising a sieve body and a means for producing vibration, the sieve body including a screen to be vibrated by the vibration-producing means, the sieve body being adapted to convey a mixture of water and the materials containing the fibrous material onto the screen whereby finer particles and water are passed through meshes of the screen by the vibration of the screen, leaving the fibrous materials on the screen, the vibratory sieve being characterized in that the sieve body is provided with an annular ring member having a circumferentially closed confining wall and a bottom surface which said bottom surface is in uninterrupted circumferential contact with said screen, said annular ring member being substantially hollow inside said confining wall and vertically open adjacent said confining wall, said annular ring member being movable on the screen surface by the vibration of the screen and with means for confining the movement of the annular ring member such that the mixture of the water and the materials containing the fibrous materials is placed inside the annular ring member and the fibrous materials are vibrated by the screen inside of the annular ring member so as to be trapped therein and become bundled together into masses which bundled masses then pass out of said annular ring member by movement over said confining wall.

2. A vibratory sieve according to claim 1 wherein the fibrous materials are asbestos.

3. A vibratory sieve according to claim 1 wherein the annular ring member is one made of a soft material.

4. A vibratory sieve according to claim 1 wherein the annular ring member is one made of rubber.

5. A vibratory sieve according to claim 1 wherein the annular ring member is rectangular in the cross section.

6. A vibratory sieve according to claim 1 wherein a projection or projections are formed on the outer periphery of the annular ring member.

7. A vibratory sieve according to claim 1 wherein the annular ring member is circularly annular in shape.

* * * * *